(12) United States Patent
Dimitriou

(10) Patent No.: US 11,164,333 B2
(45) Date of Patent: Nov. 2, 2021

(54) MONITORING ICON STATUS IN A DISPLAY FROM AN EXTERNAL DEVICE

(71) Applicant: Gracenote, Inc., Emeryville, CA (US)

(72) Inventor: Konstantinos Antonio Dimitriou, Berkeley, CA (US)

(73) Assignee: Gracenote, Inc., Emeryville, CA (US)

( * ) Notice: Subject to any disclaimer, the term of this patent is extended or adjusted under 35 U.S.C. 154(b) by 84 days.

(21) Appl. No.: 16/837,467

(22) Filed: Apr. 1, 2020

(65) Prior Publication Data

US 2021/0241488 A1 Aug. 5, 2021

(30) Foreign Application Priority Data

Jan. 31, 2020 (GR) .............................. 20200100050

(51) Int. Cl.
*G06T 7/73* (2017.01)
*G06T 7/11* (2017.01)
*G06F 3/0481* (2013.01)
*G06N 3/08* (2006.01)

(52) U.S. Cl.
CPC ............. *G06T 7/74* (2017.01); *G06F 3/04817* (2013.01); *G06T 7/11* (2017.01); *G06N 3/08* (2013.01); *G06T 2207/10016* (2013.01); *G06T 2207/10141* (2013.01)

(58) Field of Classification Search
CPC ....... G06T 7/337; G06T 7/001; G06T 7/0014; G06T 7/74; G06T 7/248
See application file for complete search history.

(56) References Cited

U.S. PATENT DOCUMENTS

| 5,377,279 | A  | * | 12/1994 | Hanafusa  | G01N 21/8903 382/141 |
|---|---|---|---|---|---|
| 6,970,588 | B1 | * | 11/2005 | Komatsu   | G06K 9/6253 382/141 |
| 9,892,488 | B1 | * | 2/2018  | Brailovskiy | G06T 7/337 |
| 2009/0322894 | A1 | * | 12/2009 | Abe | G06T 7/248 348/222.1 |
| 2016/0337629 | A1 | * | 11/2016 | Koike | H04N 9/646 |
| 2017/0148153 | A1 | * | 5/2017  | Nakao | G06T 7/0004 |
| 2019/0228737 | A1 | * | 7/2019  | Lin   | G09G 3/006 |
| 2020/0029069 | A1 | * | 1/2020  | Goergen | G06T 7/0002 |
| 2020/0279377 | A1 | * | 9/2020  | Gabel | H04N 5/272 |

* cited by examiner

*Primary Examiner* — Wen W Huang
(74) *Attorney, Agent, or Firm* — McDonnell Boehnen Hulbert & Berghoff LLP

(57) ABSTRACT

Systems and methods for monitoring of icon in an external display device are disclosed. Images of an icon displayed in a display device may be continually captured as video frames by a video camera of an icon monitoring system. While operating in a first mode, video frames may be continually analyzed to determine if the captured image matches an active template icon known to match the captured image of the icon. While the captured image matches the active template icon, operating in the first mode continues. Upon detecting a failed match to the active template icon, the system starts operating in a second to search among known template icons for a new match. Upon finding a new match, the active template icon may be updated to the new match, and operation switches back to the first mode. Times of transitions between the first and second modes may be recorded.

20 Claims, 4 Drawing Sheets

MONITORING ICON STATUS IN A DISPLAY FROM AN EXTERNAL DEVICE

CROSS-REFERENCE TO RELATED APPLICATIONS

The present application claims priority to Greek Patent Application 20200100050, filed in the Greek Patent Office on Jan. 31, 2020, and which is hereby incorporated in its entirety herein by reference.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method is disclosed. The method may be carried out by a system including a computing device and a video camera communicatively connected with the computing device. The method may involve operating in a first mode, wherein operating in the first mode comprises: with the video camera, continually capturing video images in an image plane of the video camera of an icon displayed in a sub-region of a display region of a display device, wherein the display device is external to the computing device and video camera, wherein the sub-region of the display region is fractionally larger than the icon and maps to a corresponding sub-region of the image plane, and wherein the video images captured in the image plane comprise video frames; for each respective video frame of at least a subset of the video frames, computationally comparing a template icon with the video image of the icon captured in the corresponding sub-region of the image plane during the respective video frame; for each computational comparison for which the captured image of the icon during the respective video frame matches the template icon to within a matching threshold: (i) recording information associated with the respective video frame, and (ii) continuing operation in the first mode; and upon occurrence of at least one computational comparison for which the captured image of the icon during a given one of the respective video frames fails to match the template icon to within the matching threshold: (i) recording information associated with the given one of the respective video frames, and (ii) switching to operation in a second mode; and operating in the second mode upon switching to operation in the second mode, wherein operating in the second mode comprises: determining a new template icon that matches the captured image of the icon during the given one of the respective video frames to within the matching threshold; setting the template icon to the new template icon; and switching to operation in the first mode.

In one aspect, a system is disclosed. The system may include one or more processors, a video camera, and memory. The memory may store instructions that, when executed by the one or more processors, cause the system to carry out operations including: operating in a first mode, wherein operating in the first mode comprises: with the video camera, continually capturing video images in an image plane of the video camera of an icon displayed in a sub-region of a display region of a display device, wherein the display device is external to the system, wherein the sub-region of the display region is fractionally larger than the icon and maps to a corresponding sub-region of the image plane, and wherein the video images captured in the image plane comprise video frames; for each respective video frame of at least a subset of the video frames, computationally comparing a template icon with the video image of the icon captured in the corresponding sub-region of the image plane during the respective video frame; for each computational comparison for which the captured image of the icon during the respective video frame matches the template icon to within a matching threshold: (i) recording information associated with the respective video frame, and (ii) continuing operation in the first mode; and upon occurrence of at least one computational comparison for which the captured image of the icon during a given one of the respective video frames fails to match the template icon to within the matching threshold: (i) recording information associated with the given one of the respective video frames, and (ii) switching to operation in a second mode; and operating in the second mode upon switching to operation in the second mode, wherein operating in the second mode comprises: determining a new template icon that matches the captured image of the icon during the given one of the respective video frames to within the matching threshold; setting the template icon to the new template icon; and switching to operation in the first mode.

In another aspect, non-transitory computer-readable medium is disclosed. The non-transitory computer-readable medium may store thereon program instructions that, upon execution by one or more processors of a system comprising a video camera, cause the system to carry out operations including: operating in a first mode, wherein operating in the first mode comprises: with the video camera, continually capturing video images in an image plane of the video camera of an icon displayed in a sub-region of a display region of a display device, wherein the display device is external to the system, wherein the sub-region of the display region is fractionally larger than the icon and maps to a corresponding sub-region of the image plane, and wherein the video images captured in the image plane comprise video frames; for each respective video frame of at least a subset of the video frames, computationally comparing a template icon with the video image of the icon captured in the corresponding sub-region of the image plane during the respective video frame; for each computational comparison for which the captured image of the icon during the respective video frame matches the template icon to within a matching threshold: (i) recording information associated with the respective video frame, and (ii) continuing operation in the first mode; and upon occurrence of at least one computational comparison for which the captured image of the icon during a given one of the respective video frames fails to match the template icon to within the matching threshold: (i) recording information associated with the given one of the respective video frames, and (ii) switching to operation in a second mode; and operating in the second mode upon switching to operation in the second mode, wherein operating in the second mode comprises: determining a new template icon that matches the captured image of the icon during the given one of the respective video frames to within the matching threshold; setting the template icon to the new template icon; and switching to operation in the first mode.

DETAILED DESCRIPTION

I. Overview

Figure 1:
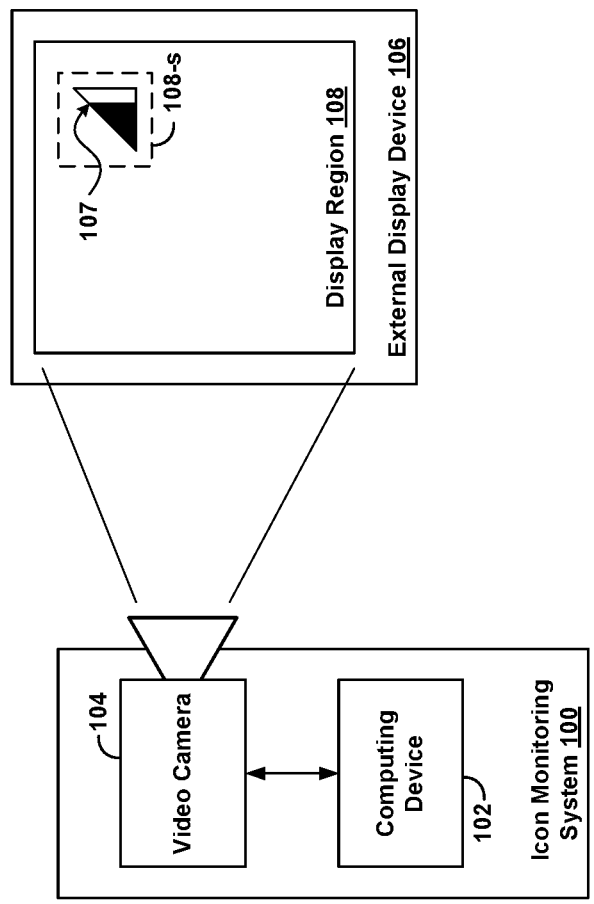
FIG. 1 is a simplified block diagram of an example icon monitoring system in which various disclosed principles can be implemented.

A computing device that includes a display component may display images in the display component that visually convey information not readily or conveniently available to a programming interface of the computing device. For example, an image displayed in the display component of a computing device may signify or indicate particular information relating to operation of the computing device that may not be accessible to a programming interface of the computing device. Considering a more specific example, a smartphone with a display screen may display an image of an icon that visually represents status of a broadband connection to a cellular communications network. While a user of the smartphone may thus be visually informed of the broadband connection status, the operating system of the smartphone may not enable applications developed by users and/or third-parties to access the broadband connection status through a programming interface. A similar example could involve an icon representing battery level. Other examples are possible as well, and may apply to other types of devices with displays, besides smartphones. For example a TV set may be considered a type of computing device, at least to the extent that it may include processing components. Particular images on the TV set display screen may be indicative of such information as channel, program, or other operational status. Conventionally, this information may not be obtainable by means other than visual display.

Visual display of operational status information of a computing device, or other types information relating to the computing device, may be sufficient for many purposes of one or more individual users, but the inventor has recognized that there can be instances in which a more automated process of a type precluded by a lack or absence of a programming interface may be required or at least desirable. The inventor has further recognized that a lack or absence of a programming interface may be overcome by automated monitoring of the display. More particularly, the display component of a computing device may be visually monitored by an image-capture device external to the computing device, and the captured images of the display may be computationally evaluated to determine the information content represented therein. The determined information content may thus be used to obtain, through automated monitoring, types of information otherwise available only through visual presentation. Further still, the inventor has devised a monitoring system that incorporates both an image-capture device for the automated monitoring of an external display device, and a processing system to carry out the computational evaluation of the captured images.

Example embodiments of an automated monitoring system and methods for its use are described herein in terms of a particular use case involving monitoring of one or more icons displayed on a smartphone or tablet-like device. This particular use case illustrates not only how example embodiments may be devised and operated, but also serves to exemplify situations and circumstances in which example embodiments advantageously address and/or solve problems and/or challenges posed by computing devices that visually provide particular information in a display but do not also provide corresponding information via a programming interface. In consideration of the example use case illustrated herein, the monitoring system is referred to as an "icon monitoring system." It should be understood that the principles and procedures described herein by way of example, and in the context of the particular example use case, are not limited to only the particular use case, or limited by the specific example embodiments described herein. Rather, the principles and procedures are more generally applicable, and/or may be extended to, other circumstances and situations in which computing devices visually provide particular information in a display but do not also provide corresponding information via a programming interface, or do not also provide any other means for determining the particular information other than its visual presentation in a display device.

One instance of the example use case considered herein may be described more specifically in terms of the following scenario. A communications service provider that delivers services such as digital content or media over one or more cellular broadband networks may be interested in the level and quality of broadband connectivity provided by the one or more networks. The level and quality may be at least partly assessed by obtaining various types of operational statistics, such as sizes and shapes of wireless and/or cellular coverage regions or zones, signal quality as a function of location with respect to coverage regions or zones, with respect time of day, and/or with respect to end-user device type. Operational statistics may also include which particular wireless broadband technologies are available as a function of location with respect to coverage regions or zones, with respect time of day, and/or with respect to end-user device type. By way of example, coverage regions or zones could correspond to geographical regions, metropolitan areas, and cells, among others. Signal quality may include signal strength and/or signal-to-noise characteristics, among others. Broadband technologies could refer to standards and related protocols, such as 3G ("third generation"), 4G ("fourth generation"), LTE ("long-term evolution"), and 5G ("fifth generation"), among other communication technologies known in the art.

While the owner or operator of a cellular broadband network may have specialized equipment designed for obtaining measurements of, or related to, operational statistics of its own network, a service provider of digital services, content, and/or media may not own or operate the carrier or access networks that connect the service provider with end users, and over which the services are delivered. As such, a service provider may not typically own or operate the types of specialized measuring or monitoring equipment available to a network owner/operator. Further, a service provider may deliver services over one or more of variety of different available cellular broadband networks, as well as possibly over other wired and/or wireless access technologies, such as WiFi, cable, and optical fiber, for example. Limiting consideration to just cellular broadband connectivity, if just for illustrative purposes, exemplifies challenges to service providers wishing to evaluate aspects of quality-related statistics of the networks that carry and deliver the service provider's services to end users.

In accordance with example embodiments, a collection of smartphones of possibly different types and/or manufactures, and with service subscriptions to one or more different cellular broadband networks, may be configured in or on a mobile vehicle, such as a car, van, or truck. One or more icons representing operational status of each smartphone's broadband connection may be continuously monitored as the vehicle travels about in and around different locations of interest in order to map out the operational status with respect to time, location, broadband network, and smartphone type. Changes in operational status may be reflected in changes in the particular icons displayed, and possibly the positions of icons in the displays. In further accordance with example embodiments, an icon monitoring system as described by way of example herein may be used to automate monitoring of the relevant icons on each smartphone configured within the mobile vehicle, and further to continuously track and record the icons over time and (at least by inference or derivation) location of the smartphones. The record of icons displayed may be analyzed to determine the operational statuses represented by the icons as a function of time and location. Known information about the cellular broadband network(s) to which the smartphones subscribe, as well as type/manufacturer of the smartphones, may be used to extend the analysis to network and smartphone type as well.

If not for the advantageous icon monitoring system devised by the inventor and disclosed herein, the absence on the smartphones of a programming interface to obtain the status information represented in the displayed icons would make the monitoring process tedious, burdensome, and impractical, entailing manual (human) visual observation and recording. The icon monitoring system, described by way of example herein, may thus be used to automate what might otherwise be an impractical, if not nearly impossible, monitoring task, particularly as the number of smartphones deployed in each vehicle increases, and the number of vehicles deployed increases. Further, as describe in detail below, example embodiments of the icon monitoring system may recognize when an icon displayed in a particular sub-region of a smartphone display (or more generally, in a sub-region of a display device) changes or is replaced with a different icon, possibly representing a change operational status of the smartphone or of the smartphone's cellular broadband connection. In addition, example embodiments of an icon monitoring system may also account for occasional physical misalignment between an image-capture device used to capture images of an icon and a smartphone in which the icon is displayed. Such misalignment could arise as result of motion of a vehicle in which the smartphone and icon monitoring system are deployed, for example.

It should be understood that application of the smartphone use case example could also be extended to other types of access networks. Non-limiting examples include WiFi, cable, and fiber optic. Again, example embodiments of an icon monitoring system could be modified or extended for use with different types of devices that include display components. For example, and as noted, a TV may be considered a type of display device that does not typically (if at all) provide any interface or other means for determining display content, other than the visual presentation of that content on the display screen. Further, a TV may be connected to a variety of delivery services, and by way of a variety of connections, such as cable, WiFi, fiber optic, and over-the-air (e.g., traditional TV broadcasts). Thus, other use cases such as those involving monitoring of cable channel quality, content, and/or status may also benefit from an icon monitoring system (though the application need not be restricted explicitly to icons only).

II. Example Architecture

A. Example Icon Monitoring System

FIG. 1 is a simplified block diagram of an example icon monitoring system 100. The example icon monitoring system may include a computing device 102 and a video camera 104 communicatively connected to the computing device 102. For purposes of illustration of basic operating principles, FIG. 1 also depicts an external display device 106 configured to display images in a display region 108. The external display device 106 may be considered a "subject" of the icon monitoring system 100, in the sense that it is subject to the monitoring carried out by the icon monitoring system 100. The external display device 106 may be a smartphone or tablet-like device, or may be a display component of a smartphone or tablet-like device. In example use cases, the external display device could be part of a computing system, such as a PC, laptop computer, desktop computer, or the like.

Note that the computing device 102, which is part of the icon monitoring system 100, is distinct from the same term, "computing device," discussed above in association with the display device. Specifically, the computing device 100 refers to a processing device, component, or system of the icon monitoring system 100, and may be configured for carrying out operations of the icon monitoring system 100, as describe in detail below. The computing device discussed in association with display device discussed above refers more generally to a computing component of any device or system, such as a smartphone, tablet device, laptop computer, or the like, which includes a display component that is the subject of the monitoring discussed herein. For the purposes of brevity in the remainder of the present disclosure, the term "display device" will be used to refer to a device that includes a display component and is assumed to include one or another type of computing or processing component that, among other things, may make the display component operable to display images in a display region. Non-limiting examples of a "display device" may thus include a smartphone, tablet-like device, laptop computer, desktop computer, or TV set (device). Unless otherwise stated, the term "computing device" or "computing system" will be used to refer to a processing or computing component of an example icon monitoring system. Further, the display device will be taken to be external to, and/or separate from, the icon monitoring system.

The video camera 104 may include an image plane, and may be arranged to capture video images of in the image plane of an icon displayed in a sub-region of the display device 106. An example of the image plane may include a charge coupled device (CCD), as is known in the art. Other types of image-plane technologies may be used as well, and example embodiments such as those described herein are not limited to or by a particular image-plane technology. As shown, the display region 108 of external display device 106 includes a sub-region 108-s in which an icon 107 is displayed. The video camera 104 is depicted with an aperture-like element opening toward the external display device 106. The slanted lines from the aperture-like element to the display region 108 represent the video camera 104 viewing the display region 108.

Although not necessarily shown in FIG. 1, the icon monitoring system 100 may include a physical mounting apparatus for mounting the external display device 106 in a fixed or nearly fixed orientation with respect to a field-of-view (FOV) of the video camera 104. The fixed orientation may define a distance between the video camera 104 and the external display device 106, as well as the display region and image planes parallel with each other, and set an angular offset between the center of the FOV and the center of the display region 108. In an example embodiment, the mounting apparatus may be separate from both the icon monitoring system 100 and the external display device 106, but nevertheless provide a physical mechanism for fixing the orientation. In another example embodiment, a separate mounting apparatus may be used for each of the icon monitoring system 100 and the external display device 106. In this arrangement, aligning and/or orienting the icon monitoring system 100 and the external display device 106 may entail manually adjusting relative positions and orientations of the two physical mounting apparatuses.

In accordance with example embodiments, the video camera 104 may continually capture images of the sub-region 108-s, and by doing so, capture images of the icon 107. The captured images may be in the form of video frames, each of which may have one or more time indictors, such as a time stamp. Each frame may be analyzed by the computing device 102 in order to identify the icon 107 and match it to one of possibly multiple known icons. During the course of monitoring, the icon may change from one particular icon to a different one. A frame-by-frame analysis may enable the computing device to recognize when such a change occurs, and to determine a new matching icon from among the known icons. Further, by recording the time stamps of frame associated with observed icons, and particularly with changes in observed icons, the computing system may thereby create a temporal record of icons displayed in the display region 108, including recording the position of the sub region 108-s. The temporal record may subsequently (or in real time) be correlated with geographical location of the icon monitoring system 100 and the external display device 106. The particular icons displayed as function of time (e.g., time stamps) may be correlated with the known icons that the displayed icons were determined to have matched. Then, by associating the matched icons with known operational status information of the external display device 106 that they represent, the operational status information may be correlated with time and location. Further details of operation of an example icon monitoring system are described below.

B. Example Computing System

Figure 2:
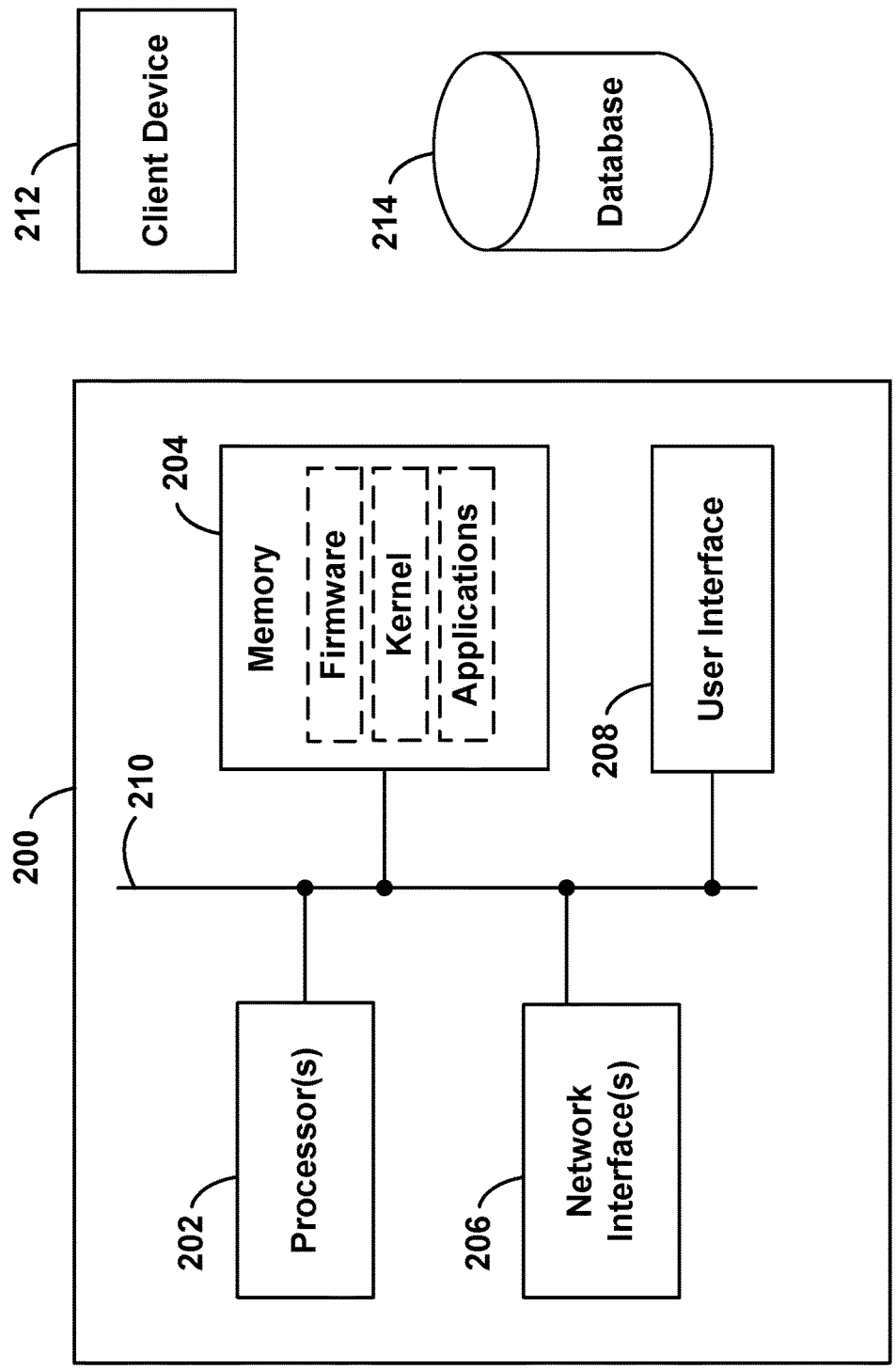
FIG. 2 is a simplified block diagram of an example computing system in which various disclosed principles can be implemented.

FIG. 2 is a simplified block diagram of an example computing system 200. The computing system 200, which may correspond to a computing device or system of an icon monitoring system, can be configured to perform and/or can perform one or more acts, such as the acts described in this disclosure. For example, the computing system 200 may correspond to the computing device 102 of the icon monitoring system 100 shown in FIG. 1. The computing system 200 can include various components, such as a processor 202, a data storage unit 204, a communication interface 206, and/or a user interface 208. In an example configuration, the computing system 200 may correspond to the computing device 102 of the icon monitoring system 100 shown in FIG. 1.

The processor 202 can include one or more general-purpose processors (e.g., one or more microprocessors) and/or special-purpose processors (e.g., one or more digital signal processors). The processor 202 can execute program instructions included in the data storage unit 204 as described below.

The data storage unit 204 can include one or more volatile, non-volatile, removable, and/or non-removable storage components, such as magnetic, optical, and/or flash storage, and/or can be integrated in whole or in part with the processor 202. Further, the data storage unit 204 can take the form of a non-transitory computer-readable storage medium, having stored thereon program instructions (e.g., compiled or non-compiled program logic and/or machine code) that, upon execution by the processor 202, cause the computing system 200 and/or another computing system to perform one or more acts, such as the acts described in this disclosure. These program instructions can define, and/or be part of, a discrete software application.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. Thus, the computing system 200 can transmit data to, and/or receive data from, one or more other entities according to one or more protocols. In one example, the communication interface 206 can be a wired interface, such as an Ethernet interface. In another example, the communication interface 206 can be a wireless interface, such as a cellular or WiFi interface. In an example configuration, the communication interface 206 may provide a communicative connection to the video camera 104 of the icon monitoring system 100 shown in FIG. 1. As such, the computing system 200 may receive and process video images captured by the video camera 104.

The user interface 208 can allow for interaction between the computing system 200 and a user of the computing system 200, if applicable. As such, the user interface 208 can include input components such as a keyboard, a mouse, a remote controller, a microphone, and/or a touch-sensitive panel and/or output components such as a display device (which, for example, can be combined with a touch-sensitive panel) and/or a sound speaker.

The computing system 200 can also include one or more connection mechanisms that connect various components within the computing system 200. For example, the computing system 200 can include a connection mechanism 210 that connects components of the computing system 200, as shown in FIG. 2.

In some configurations, the computing system 200 can include one or more of the above-described components and can be arranged in various ways. For example, the computing system 200 can be configured as a server and/or a client (or perhaps a cluster of servers and/or a cluster of clients) operating in one or more server-client type arrangements, for instance.

III. Example Operation

Figure 3:
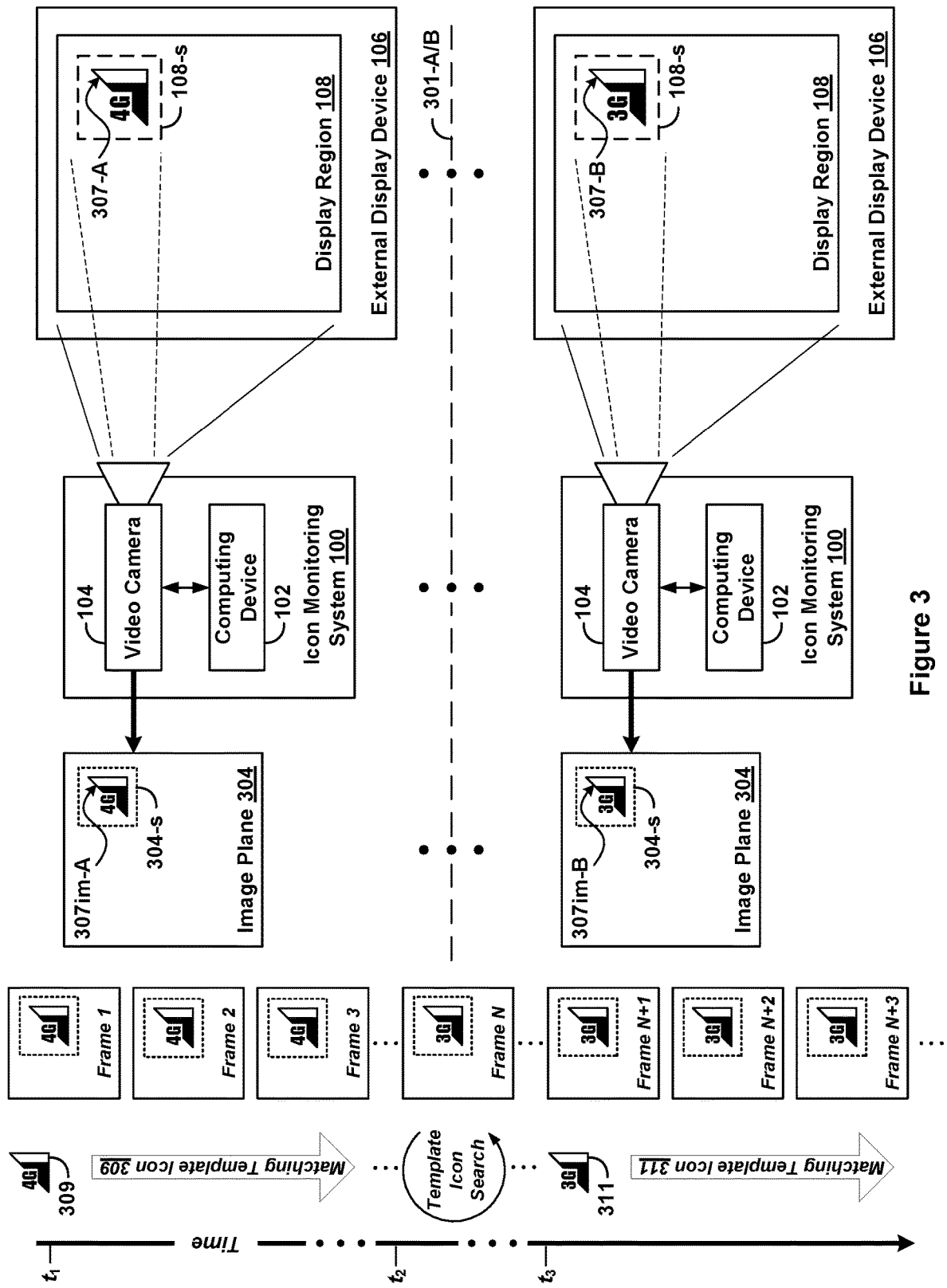
FIG. 3 illustrates example operation of an example icon monitoring system, in accordance with example embodiments.

Example operation of an example embodiment of an icon monitoring system is illustrated conceptually in FIG. 3, which shows two instances of the icon monitoring system 100 and the external display device 106 of FIG. 1. For purposes of illustration, and by way of example, the external display device 106 may be taken to be a smartphone with a cellular broadband connection to a cellular wireless communication system to which the smartphone (or a user associated with the smartphone) has a service subscription, or the like. Wireless access to the cellular wireless system may be through a radio access network (RAN) that connects to a core network of the cellular wireless system. As is known, a RAN may support various air interface technologies and protocols, such 3G, 4G, and 5G among others. It may be typical or common for a smartphone to display an icon indicating which protocol is currently in use, and a signal or quality level of the connection. Thus, such an icon may visually convey status information of the smartphone's broadband connection. As the smartphone may move about with respect to one or more RANs, or for other possible operational reasons, the connection status may change, and the change may be conveyed by a change in the icon displayed. This status-change scenario may be considered in FIG. 3 to illustrate operation of the example icon monitoring system 100.

The two instances of the icon monitoring system 100 and the external display device 106 shown in FIG. 3 represent operation across two different periods, where time is represented in the vertical direction and increasing downward, as indicated by a downward-pointing arrow (labeled "Time") at the left side of the figure. The two time periods are separated by dotted line 301-AB, where the "A" period is above the dotted line and the "B" period is below the dotted line. By way of example, there are three times instants marked off on the downward time arrow: $t_1$, $t_2$, and $t_3$. As indicated, the "A" time period spans a time from at least as early as $t_1$ until a time after $t_2$ but before $t_3$. The "B" time period begins at a time after the "A" time period ends, but before $t_3$. Thus, the transition from the "A" to the "B" time period begins at some time between $t_2$ and $t_3$. The nature of this transition in connection with the icon monitoring system 100 is described in more detail below.

As illustrated, during the "A" time period, an icon 307-A is displayed in sub-region 108-s of the display region 108. During the "B" time period, a different icon, icon 307-B, is displayed in sub-region 108-s of the display region 108. By way of example, the icon 307-A represents signal strength of a 4G broadband connection, and the icon 307-A represents signal strength of a 3G broadband connection. The transition from the "A" to the "B" time period involves the switch of icons displayed in the sub-region 108-s, and may therefore be taken to represent a change in operational status of the external display device 106 from a 4G to a 3G broadband connection. Operation of the icon monitoring system 100 may be described by way of example in terms of actions taken during the two time periods, as well as during the transition between them. The actions are illustrated conceptually, as described below.

In accordance with example embodiments, icon monitoring may entail initially identifying a particular icon displayed in an external display device, which may further entail determining the sub-region of the display region in which the particular icon is displayed. The sub-region of the display region may be described in terms of both a size and a location in the display region. In further accordance with example embodiments, the size of the sub-region may be specified as fractionally larger than the icon displayed therein. For example, the size of the sub-region may be larger than the icon by a fractional amount, such as 0.1 or 0.2, which could also be expressed as 10% or 20% larger. In practice, the sub-region may be considered as a two-dimensional boundary around the icon, with margins between the icon and the boundary that are only a fraction of the size of the icon. Further details of initial determination of both the icon displayed and the sub-region are described later, after the following description of operations represented in the "A" and "B" time periods.

Returning, then, to FIG. 3, an instance of an image plane 304 of the video camera 104 is shown for each of the two instances of the icon monitoring system. Each instance of the image plane 304 includes a sub-region 304-s in which video images of the display sub-region 108-s of the external display device 106 are captured. The sub-region 304-s may be a particular collection or subset of pixels in the image plane 304, for example.

During the "A" time period, while the video camera 104 is monitoring the display region 108, as indicated by the solid slanted lines, it captures video images of the icon 307-A in the sub-region 108-s, as indicated by the dash slanted lines. Video images of the icon 307-A are captured as image 307im-A in the image plane sub-region 304-s. More particularly, and in accordance with example embodiments, icon 307-A is captured as image 307im-A in successive video frames. This is illustrated conceptually by vertically-stacked frames labeled "Frame 1," "Frame 2," "Frame 3," and followed by vertical ellipses indicating additional video frames in which the image 307im-A is captured.

In accordance with example embodiments, the computing device 102 may continually analyze the information in the successive video frames to attempt to match the image captured within the image plane sub-region 304-s against a template icon, and thereby determine what icon is displayed in the sub-region 108-s of the display region 108 of the external display device 106. For the current illustration, during the "A" time period, a template icon 309 is determined to match the image 307im-A in each of Frame 1, Frame 2, Frame 3, and possibly some number of succeeding frames (indicated by the vertical ellipses). The matching operation is indicated by an annotated, broad downward arrow between $t_1$ and $t_2$. The template icon 309 may be referred to an "active template icon" in consideration of its being a match to the video image 307im-A, corresponding to the currently displayed icon 307-A.

In further accordance with example embodiments, the matching operation carried out by the computing device 102 may involve one or more analytical techniques for comparing the active template icon with an image in the sub-region 304-s of the image plane in each video frame. One example matching technique may entail calculating a normalized cross-correlation, in which a correlation coefficient between the active template icon and the image in the sub-region 304-s is computed for each pixel of the image. The correlation coefficient may be taken as a measure of similarity between the template icon and the image at each pixel location, where a higher value of the correlation coefficient indicates a better match, and vice versa. A sum of correlation coefficients for all the pixels may be computed and compared with a matching threshold to determine whether or not the icon displayed in the sub-region 108-s of the external display device matches the active template icon. A positive match may be determined to have been made if the sum of correlations is at least as large as the matching threshold. In an example, the sum of correlation coefficients may be normalized such that its maximum value is one, in which case the matching threshold could be a fraction no larger than one. Example values of the matching threshold could be 0.7, 0.8, or 0.9, though other values could be used. Other forms of normalized cross-correlation may be used as well. For example, the correlation may be computed in frequency space by taking Fourier transforms of the images.

While conventional approaches to normalized cross-correlation for comparing images with templates (or more generally reference images) can be computationally expensive, particularly when carried out for each video frame, example embodiments herein provide significant reduction and/or constraint of computational costs by advantageously limiting the analysis to only the sub-region 304-s of the image plane 304 captured in each frame. By doing so, only the subset of pixels that make up the sub-region 304-s need to be considered in the computations. That is, the matching analysis need not necessarily have to consider all of the pixels that make up the image plane 304, but rather only those of the sub-region 304-*s*. As a beneficial result, the matching operation may be carried out rapidly and efficiently, even on a frame-by-frame basis.

Another example matching technique may involve one or another form of a machine learning algorithm. In accordance with example embodiments, such a machine learning algorithm may involve an artificial neural network (ANN) as a trained classifier or a trained predictor of probable identification of one or more items of a class of items. As is known, an ANN may be computationally constructed as a plurality of interconnected layers, including an input layer, an output layer, and one or more intermediate layers. Each layer may be made up of one or more nodes having inputs and outputs. The inputs of nodes in one layer may be connected to the output of nodes of the preceding layer, except that the inputs to the nodes of the input layer receive input data, and the outputs of the nodes of the output layer provide a prediction that the input data matches one or another type of pattern that the ANN has been trained to recognize. Typically, training for image recognition may involve inputting known training images and adjusting parameters of the nodes in a feedback-like procedure to maximize an output prediction or probability by the ANN that the input matches the training images. Once trained, one or more "runtime" images may be input to the trained ANN to determine a quantitative prediction or probability that one or more of the runtime images match the training image (or images). In this sense, the ANN is trained to recognize images that match or are similar to know training images.

In the current example, an ANN may be trained to recognize one or more template icons, such that inputting the image in the sub-region 304-*s* of each frame yields as output a prediction or probability that the input image matches one of the template icons, and in particular, the active template icon. With this arrangement, the matching operation applied to Frame 1, Frame 2, Frame 3, and the succeeding frames indicated by the vertical ellipses may entail inputting the pixel data of sub-region 304-*s*, frame-by-frame, to the trained ANN. For each frame, the ANN may then output a probability that the pixel data matches the template icon 309. In the example operation, with template icon 309 being the active template icon, the probability may be expected to predict a match for each of Frame 1, Frame 2, Frame 3, and at least some of the succeeding frames.

As with the normalized cross-correlation approach, restricting the ANN approach (or more generally the machine learning classifier approach) to just the pixels of the sub-region 304-*s* of each video frame may advantageously enable otherwise expensive computations to be carried out quickly and efficiently. In this case, the ANN need only evaluate a subset of pixels of the image plane 304, namely just those of the sub-region 304-*s*.

Continuing with the example operation illustrated in FIG. 3, evidently and by way of example, the icon displayed in the sub-region 108-*s* of the external display device 106 changes from the 4G icon 307-A to the 3G icon 307-B at some point in time between $t_2$ and $t_3$. This could be due to the external display device 106 (a smartphone in this example) moving to a different RAN or different cell of the RAN, for example. Additionally or alternatively, the change in icon could be due to a change traffic conditions in the RAN. There could be other reasons as well. In any case, after the change, starting at "Frame N" the video camera 104 will begin to capture the 3G icon 307-B as video image 307*im*-B in the sub-region 304-*s* of its image plane 304, as shown. At this point, the matching operation carried out by the computing device 102 will fail to detect a match between the video image 307*im*-B and the template icon 309, which is a match to the 4G icon 307-A. In accordance with example embodiment, operation may begin a search for new active template icon that matches the video image 307*im*-B.

More particularly, the computing device 102 may input the pixels of sub-region 304-*s* into the matching operation (or algorithm), but do so in a searching mode in which one or more different template icons are tested as a match until matching criteria are met. At this point, the matching template icon may be set as the new active template icon. As described, the matching operation may be performed by applying normalized cross-correlation matching or an ANN (or other machine learning classifier or predictor). In the current example, the searching determines that the template icon 311 matches the video image 307*im*-B captured beginning with Frame N. At this point, the template icon 311 is set to the new active template icon, replacing template icon 309. In the illustrated example, the replacement is made by time $t_3$, so that starting with "Frame N+1" and continuing at least through "Frame N+2" and "Frame N+3," the video image 307*im*-B matches the new active template icon (template icon 309 in this example) to within the matching criteria applied. Operation with template icon 311, indicated by the annotated, broad downward arrow after $t_3$ proceeds as described above for the template icon 309.

In the illustrated example, it appears that the template icon search, indicated by a notation to the left of Frame N, completes by Frame N+1. It should be understood that the template search could take longer, and that a new active template icon may not necessarily be determined until two or more frames beyond Frame N.

During all of the operations described above, including matching with template icon 309, template icon searching, and matching with template icon 311, the video camera 104 may be continually capturing video frames of the image plane 304, and continually providing them, in one form or another, to the computing device 102 for matching processing and analysis. As part of the processing and analysis, the computing device may keep track of time stamps and/or other sequencing identifiers associated with the video frame. In an example embodiment, such information may be represented as metadata, as would be understood in the art. Other forms of ancillary frame information may be possible as well.

The time stamp information and other metadata may be recorded or stored in one or another form of storage associated or part of the computing device 102. An example of computing device 102 may be the computing device or system illustrated in FIG. 2 and described above. Metadata and/or timing data associated with the icon monitoring process may thus be stored in the database 214, or other forms of memory or storage, for example.

In accordance with example embodiments, the timing information or data may be used to mark time periods during which the icon displayed in the external display device remains unchanged, time points at which the icon changes, and time points when new active template icons are identified and made active. Recording these times with information indicating what they represent or correspond to may therefore be part of the operations of icon monitoring carried out by the computing device 102 of the icon monitoring system 100. The recorded data may then analyzed and used to evaluate operational status of the external display device 106 as represented visually in the displayed icons. In the current example, the recorded (or stored) information may be used to determine broadband connection status as function of time. Correlating time to known locations of the external display device 106 as a function of time can extend the record information to broadband connection status as function of place, as a function of RAN, and other operating variable and conditions. Additional metadata may include information about the external display device, such as model and/or manufacture. For the example use case of smartphones, metadata may also include identification of broadband service provider. Thus, evaluation of operational status or other information represented in displayed icons may be filtered or organized according to the various types of metadata information. Analysis of the recorded information may be performed in real time or at a later time. Further, analysis, whether real time or later, may be carried out by the computing device 102, or may be carried out by a different computing device or system (not shown in FIG. 3) that has access to the recorded data.

In the example use case, there may be multiple configurations such as those illustrated in FIG. 1 and/or FIG. 3 arranged in one or more mobile vehicles. As discussed above, the icon monitoring provided by the example icon monitoring system 100 may thus enable automated monitoring on a scale that would be impractical or even impossible to do manually, by human visual inspection and recording.

In accordance with example embodiments, the sub-region 304-*s* of the image plane 304 may be determined as a fixed set of pixels defining an area of the image plane 304 in which the image data are initially determined to match a template icon that is then set as the active template icon. The initial identification process for determining the initial active template icon and the sub-region 304-*s* is described in more detail below. For the moment, it may be noted that limiting or restricting analysis of the image data for the matching operation may entail determining the subset of pixels of the image plane that contain the image data that match the active template icon, and thereafter considering only those pixels in the matching analysis. As also described below, there may be instances in which a misalignment between the video camera 104 and the display region 108 of the external display device 106 causes the sub-region 108-*s* of the external display device 106 to be captured in at least some pixels of the image plane 304 that lie outside of the sub-region 304-*s*. When this occurs, the matching probability may decrease. Depending on the severity of the misalignment, the match may be determined to have failed. This is another situation that may also lead to a new template icon search. However, if the icon displayed in the sub-region 108-*s* of the external display device hasn't changed, the search may result just determining a new or revised sub-region 304-*s*, but not a new active template icon.

In a use case such as the one considered herein, in which a physical configuration of an icon monitoring system and an external display device may be deployed in a mobile vehicle, it is possible that an alignment between the video camera and the display region of the external display device may be subject to vibration or other physical disturbance. This is an example of how the sub-region 304-*s* of the image plane may begin capturing a shifted sub-region of the external display device 106 that does not contain the icon of interest, or at least does not contain it entirely. As noted, this may result in a failure to match the pixels in the sub-region 304-*s* with active template icon. In accordance with example embodiment, a failure to match that is severe enough—for example, below the matching threshold—may trigger a template icon search. The result of such a search may just be new sub-region 403-*s* that is realigned with the sub-region 108-*s* of the external display device 106.

Alignment between the video camera 104 and the display region 108 of the external display device 106 may be specified or described in terms of a tolerance for misalignment between respective normal directions of the image plane 304 and the display region 108 (where the normal direction of a given plane is perpendicular to the given plane). When the normal of the image plane 304 is perfectly aligned with the normal of the display region 108, the angle between the two normal is zero. A tolerance for misalignment may therefore correspond to a non-zero angle between the two normals that is smaller than a specified tolerance threshold. Alignment may also specify that the display region 108 falls within the field of view of the image plane 304. Assuming this to be the case (otherwise the video camera would not capture the display region 108 at all), then the angular tolerance may be translated into a maximum number of pixel offsets in the image plane 304 between perfect alignment and acceptable misalignment. Thus, alignment need not be perfect, only within the tolerance.

In accordance with example embodiments, tolerance for misalignment may be measured in terms of a maximum number of pixels of shift between the sub-region 304-*s* in the image plane and the sub-region 108-*s* in the display region 108. The maximum number may be specified as that corresponding to a shift at, and above which, matching the active template to the current icon in the sub-region 108 fails even when the current icon remains unchanged. It may be seen that the larger the size of the sub-region 108 compared to the size of the current icon, the larger the tolerance for misalignment. However, a larger tolerance may also mean a larger sub-region 304 in the image plane, and thus possibly more costly matching computations. Thus, it may be desirable to keep the sub-regions 108 and 304 as small as possible without imposing an impractically small misalignment tolerance. Determining the misalignment tolerance may accordingly depend on the specific use case of an icon monitoring system, and possibly a degree of physical alignment that may be maintained by a mounting apparatus or the like. In the current example use case, movement of the icon monitoring system configuration (system, smartphone, and mounting apparatus) may be a cause of vibration. Other use cases may involve other considerations.

The operations described above in terms of the "A" and "B" time periods presume that the template icon 309 has already been determined to be the active template icon for the "A" time period. As noted, however, there may be initial operation of the icon monitoring system 100 with the external display device 106 that precedes determination of any active template icon. That is, initial operation may entail determining an active template icon when either no previous determination has yet been made, or possibly when re-initialization is needed due, for example, to excessive misalignment.

In accordance with example embodiments, initial operation may entail scanning and/or analyzing a larger portion of the display region 108 than just the sub-region 108-*s* when searching for a matching template. The larger portion may include the entire display region 108, though not necessarily. An example algorithm may entail setting an initial size of the sub-region 304 of the image plane, and then selecting one or more initial video frames in which the entire display region 108 is captured for searching for a match. The search may involve applying the initial sub-region of the image plane as a sliding window, and advancing it across a plurality of positions in the image plane. At each position, one or another matching technique, such as those described above, may be applied to determine if the pixels at each sliding window position contain an image that matches one of a set of candidate template icons. This process may be continued until a match is found. Once the match is found, the matching candidate template icon may be set to the active template icon, and the position of the sliding window in the image plane may be set as the position of the sub-region 304.

In addition, depending on the relative size of the image of the icon, as captured in the image plane, of displayed in the external display device to the initial size of the sub-region 304, the size of the sub-region 304 may be adjusted. For example, if the image capture of the icon is larger than the initial size of the sub-region 304-s, then the size of the sub-region 304-s may be enlarged so that it is fractionally larger than the image of the icon in the image plane. Conversely, if the initial size of the sub-region 304-s is larger than the contained image by more than a specified amount, it may be adjust to a smaller size that is still fractionally larger than the contained image. For example, if the initial size of the sub-region 304-s is 1.7 times larger than the image, then in might be reduced in size to be 1.3 times larger. These relative sizes and number are just examples. Others may be used without limiting the scope of example embodiments.

In accordance with example embodiments, setting the initial size of the sub-region 304 of the image plane may depend on an expected size of an icon that is known to be one that is to be monitored. For example, in the use case described above, it may be known that the icon to be monitored is an icon representing broadband connection status. Further, it may be known that for a particular model or type of smartphone, this icon has a typical size and typical location. In this case, this information may be used to set an initial size of the sub-region 304 and an initial search area in the image plane that corresponds to (or captures) an expected location of the icon of interest in the display region of the smartphone. In this way, the initial search may be made more efficient and rapid than a search of the entire image plane with possibly multiple different initial sizes of sub-region 304. Other use cases, types of external display devices, and icons of interest may call for different initial search strategies. However, the general approach may apply to different strategies, in accordance with example embodiments.

The example operations of an example icon monitoring system described above may be implemented programmatically and/or algorithmically in terms or operating modes or states of the example icon monitoring system. In accordance with example embodiments, a first operating mode may involve monitoring the icon displayed in a display device under the conditions that an active template icon is known and set. In this mode, each successive video frame is tested for a continuing match to the active template icon. As long as each frame yields a match, the operation in the first mode continues. Operation in the first mode may be exemplified by operation during the "A" and/or "B" time periods described above. If, during operation in the first mode, a match fails for a particular video frame, operation may switch or transition to a second operating mode in which a template search is conducted. Operation in the second mode may be exemplified by operation during the template icon search, also described above. Once a matching template icon is determined during the second mode (e.g., as a result of the template icon search), operation may switch or transition back to operating in the first mode.

In further accordance with example embodiments, initial operation, as described above may precede operating in the first mode. Once an initial action template icon is determined, as described above, operation may enter the first mode.

Figure 4:
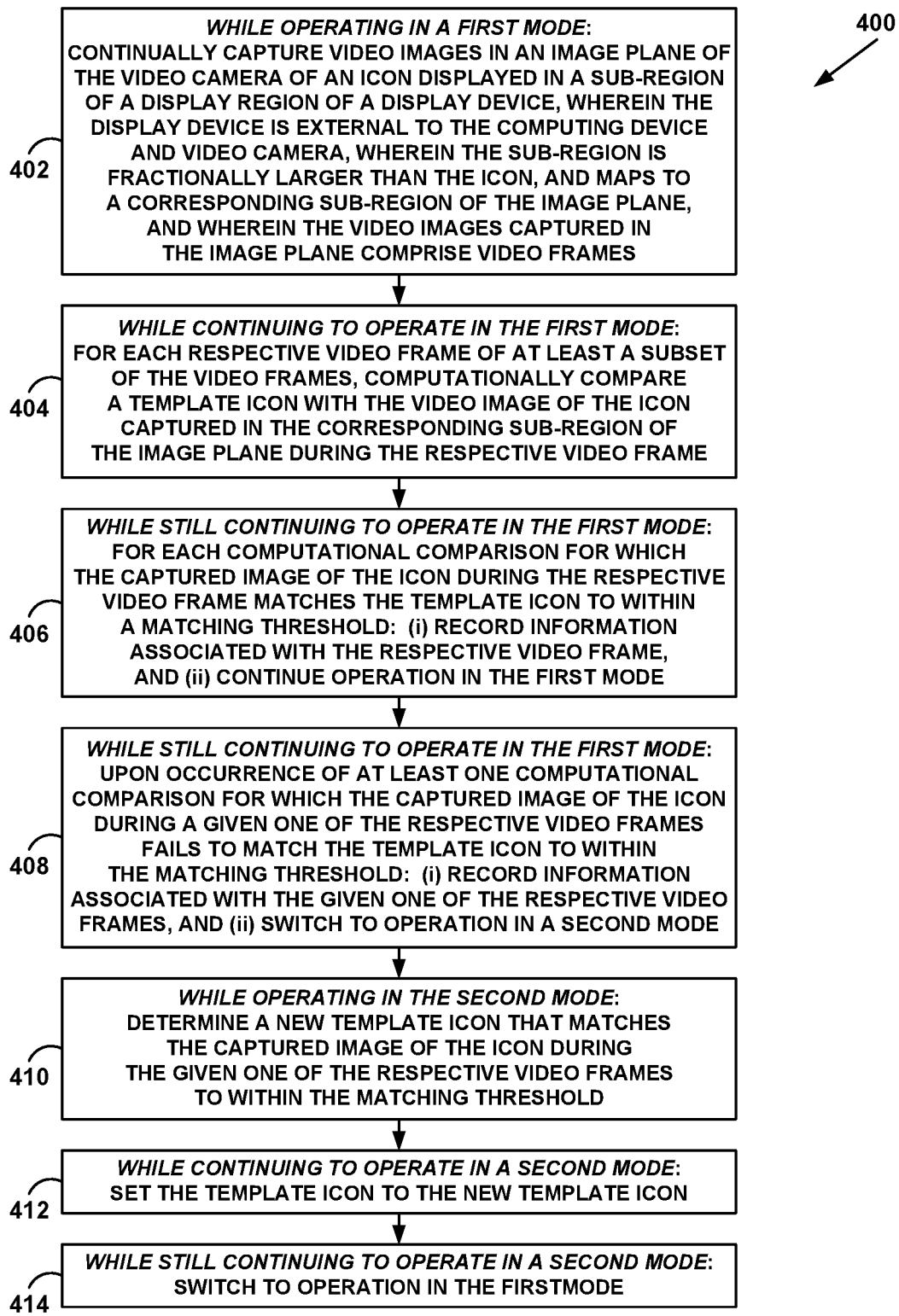
FIG. 4 is a flow chart of an example method.

FIG. 4 illustrates a flow chart of an example method 400 that may be carried out by an icon monitoring system, such as icon monitoring system 100, which includes a computing device, such as computing device 102, and a video camera, such as video camera 104. The video camera and computing device may be communicatively connected. The example method 400 may be implemented in computer-readable instructions stored in a non-transitory computer-readable medium, and carried out by one or more processors of the system, including processors that may be part of the computing device and/or processors that may be part of or associated with the video camera. In an example embodiment, the instructions, when carried out by the one or more processors of the system, may cause the system to carry out the method.

The example method 400 may be described in the context of the operational illustration of FIG. 3. As such, the example method may involve monitoring of one or more icons displayed in an external display device, such as external display device 106. Further, the example method 400 may describe operating states of an example icon monitoring system, as described above.

At block 402, the icon monitoring system may operate in a first mode. In particular, operating in the first mode may entail continually capturing video images in an image plane of the video camera of an icon displayed in a sub-region of a display region of a display device. As described above, the display device is external to the computing device and video camera. Further, the sub-region of the display region may be fractionally larger than the icon, and may map to a corresponding sub-region of the image plane. In this arrangement, the video images captured in the image plane may be in the form of video frames.

At block 404, the icon monitoring system may continue operating in the first mode. Specifically, continuing operation in the first mode may further entail, for each respective video frame of at least a subset of the video frames, computationally comparing a template icon with the video image of the icon captured in the corresponding sub-region of the image plane during the respective video frame.

At block 406, the icon monitoring system may still continue operating in the first mode. Continuing operation in the first mode may still further entail, for each computational comparison for which the captured image of the icon during the respective video frame matches the template icon to within a matching threshold: (i) recording information associated with the respective video frame, and (ii) continuing operation in the first mode. This operation may correspond to the icon monitoring system determining that the displayed icon still matches the template icon, and responsively recording metadata or the like, and continuing to operate in the first mode.

At block 408, the icon monitoring system may yet further continue operating in the first mode. Further continuing operation in the first mode may entail detecting a change in the displayed icon or a mismatch. More particularly, upon occurrence of at least one computational comparison for which the captured image of the icon during a given one of the respective video frames fails to match the template icon to within the matching threshold, the icon monitoring system may: (i) record information associated with the given one of the respective video frames, and (ii) switch to operation in a second mode. Thus, upon detecting a failed match to the current (e.g., active) template icon, the icon monitoring system may record metadata or the like indicating the failed match, as well as a time that the failed match was detected.

At block 410, upon switching to operation in the second mode, the icon monitoring system may begin operating in the second mode by determining a new template icon that matches the captured image of the icon during the given one of the respective video frames to within the matching threshold. This may correspond to the template icon search described above. The new template icon may thus correspond to a new active template icon.

At block 412, the icon monitoring system may continue operating in the second mode. Specifically, continuing operation in the second mode may entail setting the template icon to the new template icon. This may correspond to setting the active template icon to the new template icon.

Finally, at block 414, after setting the new template icon (e.g., the new active template icon), the icon monitoring system may switch or transition back to operation in the first mode. At this point, operating in the first mode may entail icon monitoring and matching using the new template icon. This may correspond to operation during the "B" time period described in connection with FIG. 3, for example.

In accordance with example embodiments, continually capturing the video images in the image plane of the video camera of the icon displayed in the sub-region of the display region of the display device may involve maintaining a threshold-limited fixed orientation of a field-of-view (FOV) direction of the video camera with respect to the display region of the display device during a time in which the video images are continually captured. As described above, the threshold-limited fixed orientation may correspond to an orientation with respect to the display region of the display device that remains constant to within a threshold amount of misalignment with respect to a fixed direction.

In further accordance with example embodiments, continually capturing the video images in the image plane of the video camera of the icon displayed in the sub-region of the display region of the display device may also entail capturing a video image of the icon in the corresponding sub-region of the image plane during each respective video frame.

In accordance with example embodiments, computationally comparing the template icon with the video image of the icon captured in the corresponding sub-region of the image plane during the respective video frame may entail computationally comparing the template icon with video image data captured only within the corresponding sub-region of the image plane. The comparison may involve a matching technique or algorithm, such as the examples described above.

In one an example, computationally comparing the template icon with the video image data captured only within the corresponding sub-region of the image plane may entail applying normalized cross correlation template matching to the video image data captured only within the corresponding sub-region of the image plane. In another example, computationally comparing the template icon with the video image data captured only within the corresponding sub-region of the image plane may entail inputting the video image data captured only within the corresponding sub-region of the image plane to an artificial neural network application configured for image recognition and trained with an image of the template icon.

In accordance with example embodiments, each respective video frame may have a respective time stamp marking a time during which the image of the icon was captured in image plane. With this arrangement, recording the information associated with the "respective video frame" may entail recording the time stamp and information identifying the template icon. As noted, the "respective video frame" is one in which a match with the template icon remains confirmed. Similarly, recording the information associated with the "given one of the respective video frames" may entail recording the time stamp and information indicating the failure to match the template icon to within the matching threshold. In this case, the "given one of the respective video frames" is one in which a match with the template fails. As such, recording the time provides a record of when the failure was detected.

In accordance with example embodiments, determining the new template icon that matches the captured image of the icon during the given one of the respective video frames to within the matching threshold may entail computationally comparing the captured image of the icon during the given one of the respective video frames with each of a plurality of candidate template icons. More particularly, computational comparison may be continually carried out until either a match to within the matching threshold is found for a given candidate template icon, or no match to within the matching threshold is found for any of the plurality of candidate template icons. If a match is found, the new icon may be set to the given candidate template icon. If no match is found, a larger area of the image plane than the sub-region may be searched. Specifically, in an area of the image plane in which an area of the display region of the display device extending beyond the sub-region is captured, scanning may be carried out for a further icon that matches one of the plurality of candidate template icons to within the matching threshold. Then the new icon may be set to the one of the plurality of candidate template icons that matches the further icon. Finally, the sub-region of the display region may be set to a new sub-region in which the further icon is displayed.

In accordance with example embodiments, the example method may also involve an initial operation for determining a current (e.g., active) template icon. Specifically, prior to operation in either of the first or second modes, the icon monitoring system may operate in an initialization mode, which may entail searching the entire image plane. More particularly, in an area of the image plane in which an area of the entire display region of the display device is captured, scanning may be carried out for an initial icon that matches an initial template icon to within the matching threshold. The icon may then be set to the initial template icon, and the sub-region of the display region may be set to an initial sub-region in which the initial icon is displayed. At this point operation may be switched or transitioned to the first mode.

IV. Example Variations

Although the examples and features described above have been described in connection with specific entities and specific operations, in practice, there are likely to be many instances of these entities and many instances of these operations being performed, perhaps contemporaneously or simultaneously, on a large scale.

In addition, although some of the acts described in this disclosure have been described as being performed by a particular entity, the acts can be performed by any entity, such as the other entities described in this disclosure. Further, although the acts have been recited in a particular order, the acts need not be performed in the order recited. However, in some instances, it can be desired to perform the acts in the order recited or in another order. Further, each of the acts can be performed responsive to performance of one or more of the other acts. Also, not all of the acts need to be performed to achieve one or more of the benefits provided by the disclosed features, and therefore not all of the acts are required.

Although certain variations have been described in connection with one or more examples of this disclosure, these variations can also be applied to some or all of the other examples of this disclosure as well.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method carried out by a system including a computing device and a video camera communicatively connected with the computing device, the method comprising:
   operating in a first mode, wherein operating in the first mode comprises:
       with the video camera, continually capturing video images in an image plane of the video camera of an icon displayed in a sub-region of a display region of a display device, wherein the display device is external to the computing device and video camera, wherein the sub-region of the display region is fractionally larger than the icon and maps to a corresponding sub-region of the image plane, and wherein the video images captured in the image plane comprise video frames;
       for each respective video frame of at least a subset of the video frames, computationally comparing a template icon with the video image of the icon captured in the corresponding sub-region of the image plane during the respective video frame;
       for each computational comparison for which the captured image of the icon during the respective video frame matches the template icon to within a matching threshold: (i) recording information associated with the respective video frame, and (ii) continuing operation in the first mode; and
       upon occurrence of at least one computational comparison for which the captured image of the icon during a given one of the respective video frames fails to match the template icon to within the matching threshold: (i) recording information associated with the given one of the respective video frames, and (ii) switching to operation in a second mode; and
   operating in the second mode upon switching to operation in the second mode, wherein operating in the second mode comprises:
       determining a new template icon that matches the captured image of the icon during the given one of the respective video frames to within the matching threshold;
       setting the template icon to the new template icon; and switching to operation in the first mode.

2. The method of claim 1, wherein continually capturing the video images in the image plane of the video camera of the icon displayed in the sub-region of the display region of the display device comprises maintaining a threshold-limited fixed orientation of a field-of-view (FOV) direction of the video camera with respect to the display region of the display device during a time in which the video images are continually captured,
   wherein the threshold-limited fixed orientation comprises an orientation with respect to the display region of the display device that remains constant to within a threshold amount of misalignment with respect to a fixed direction.

3. The method of claim 1, wherein continually capturing the video images in the image plane of the video camera of the icon displayed in the sub-region of the display region of the display device comprises capturing a video image of the icon in the corresponding sub-region of the image plane during each respective video frame.

4. The method of claim 1, wherein computationally comparing the template icon with the video image of the icon captured in the corresponding sub-region of the image plane during the respective video frame comprises computationally comparing the template icon with video image data captured only within the corresponding sub-region of the image plane.

5. The method of claim 4, wherein computationally comparing the template icon with the video image data captured only within the corresponding sub-region of the image plane comprises applying normalized cross correlation template matching to the video image data captured only within the corresponding sub-region of the image plane.

6. The method of claim 4, wherein computationally comparing the template icon with the video image data captured only within the corresponding sub-region of the image plane comprises inputting the video image data captured only within the corresponding sub-region of the image plane to an artificial neural network application configured for image recognition and trained with an image of the template icon.

7. The method of claim 1, wherein each respective video frame has a respective time stamp marking a time during which the image of the icon was captured in image plane,
   wherein recording the information associated with the respective video frame comprises recording the time stamp and information identifying the template icon,
   and wherein recording the information associated with the given one of the respective video frames comprises recording the time stamp and information indicating the failure to match the template icon to within the matching threshold.

8. The method of claim 1, wherein determining the new template icon that matches the captured image of the icon during the given one of the respective video frames to within the matching threshold comprises:
   computationally comparing the captured image of the icon during the given one of the respective video frames with each of a plurality of candidate template icons until either: a match to within the matching threshold is found for a given candidate template icon, or no match to within the matching threshold is found for any of the plurality of candidate template icons;
   if a match is found, setting the new icon to the given candidate template icon; and
   if no match is found: (i) in an area of the image plane in which an area of the display region of the display device extending beyond the sub-region is captured, scanning for a further icon that matches one of the plurality of candidate template icons to within the matching threshold, (ii) setting the new icon to the one of the plurality of candidate template icons that matches the further icon, and (iii) setting the sub-region of the display region to a new sub-region in which the further icon is displayed.

9. The method of claim 1, further comprising:
prior to operation in either of the first or second modes, operating in an initialization mode, wherein operation in the initialization mode comprises:
in an area of the image plane in which an area of the entire display region of the display device is captured, scanning for an initial icon that matches an initial template icon to within the matching threshold;
setting the icon to the initial template icon;
setting the sub-region of the display region to an initial sub-region in which the initial icon is displayed; and
switching to operation in the first mode.

10. A system comprising:
one or more processors;
a video camera; and
memory storing instructions that, when executed by the one or more processors, cause the system to carry out operations including:
operating in a first mode, wherein operating in the first mode comprises:
with the video camera, continually capturing video images in an image plane of the video camera of an icon displayed in a sub-region of a display region of a display device, wherein the display device is external to the system, wherein the sub-region of the display region is fractionally larger than the icon and maps to a corresponding sub-region of the image plane, and wherein the video images captured in the image plane comprise video frames;
for each respective video frame of at least a subset of the video frames, computationally comparing a template icon with the video image of the icon captured in the corresponding sub-region of the image plane during the respective video frame;
for each computational comparison for which the captured image of the icon during the respective video frame matches the template icon to within a matching threshold: (i) recording information associated with the respective video frame, and (ii) continuing operation in the first mode; and
upon occurrence of at least one computational comparison for which the captured image of the icon during a given one of the respective video frames fails to match the template icon to within the matching threshold: (i) recording information associated with the given one of the respective video frames, and (ii) switching to operation in a second mode;
and
operating in the second mode upon switching to operation in the second mode, wherein operating in the second mode comprises:
determining a new template icon that matches the captured image of the icon during the given one of the respective video frames to within the matching threshold;
setting the template icon to the new template icon; and
switching to operation in the first mode.

11. The system of claim 10, wherein continually capturing the video images in the image plane of the video camera of the icon displayed in the sub-region of the display region of the display device comprises maintaining a threshold-limited fixed orientation of a field-of-view (FOV) direction of the video camera with respect to the display region of the display device during a time in which the video images are continually captured,
wherein the threshold-limited fixed orientation comprises an orientation with respect to the display region of the display device that remains constant to within a threshold amount of misalignment with respect to a fixed direction.

12. The system of claim 10, wherein continually capturing the video images in the image plane of the video camera of the icon displayed in the sub-region of the display region of the display device comprises capturing a video image of the icon in the corresponding sub-region of the image plane during each respective video frame.

13. The system of claim 10, wherein computationally comparing the template icon with the video image of the icon captured in the corresponding sub-region of the image plane during the respective video frame comprises computationally comparing the template icon with video image data captured only within the corresponding sub-region of the image plane.

14. The system of claim 13, wherein computationally comparing the template icon with the video image data captured only within the corresponding sub-region of the image plane comprises applying normalized cross correlation template matching to the video image data captured only within the corresponding sub-region of the image plane.

15. The system of claim 13, wherein computationally comparing the template icon with the video image data captured only within the corresponding sub-region of the image plane comprises inputting the video image data captured only within the corresponding sub-region of the image plane to an artificial neural network application configured for image recognition and trained with an image of the template icon.

16. The system of claim 10, wherein each respective video frame has a respective time stamp marking a time during which the image of the icon was captured in image plane,
wherein recording the information associated with the respective video frame comprises recording the time stamp and information identifying the template icon,
and wherein recording the information associated with the given one of the respective video frames comprises recording the time stamp and information indicating the failure to match the template icon to within the matching threshold.

17. The system of claim 10, wherein determining the new template icon that matches the captured image of the icon during the given one of the respective video frames to within the matching threshold comprises:
computationally comparing the captured image of the icon during the given one of the respective video frames with each of a plurality of candidate template icons until either: a match to within the matching threshold is found for a given candidate template icon, or no match to within the matching threshold is found for any of the plurality of candidate template icons;
if a match is found, setting the new icon to the given candidate template icon; and
if no match is found: (i) in an area of the image plane in which an area of the display region of the display device extending beyond the sub-region is captured, scanning for a further icon that matches one of the plurality of candidate template icons to within the matching threshold, (ii) setting the new icon to the one of the plurality of candidate template icons that matches the further icon, and (iii) setting the sub-region of the display region to a new sub-region in which the further icon is displayed.

18. The system of claim 10, wherein the operations further include:
   prior to operation in either of the first or second modes, operating in an initialization mode, wherein operation in the initialization mode comprises:
   in an area of the image plane in which an area of the entire display region of the display device is captured, scanning for an initial icon that matches an initial template icon to within the matching threshold;
   setting the icon to the initial template icon;
   setting the sub-region of the display region to an initial sub-region in which the initial icon is displayed; and
   switching to operation in the first mode.

19. The system of claim 10, further comprising a further video camera,
   wherein operating in the first mode further comprises:
   with the further video camera, continually capturing further video images in an image plane of the further video camera of a further icon displayed in a sub-region of a display region of a further display device, wherein the further display device is external to the system, wherein the sub-region of the display region of the further display device is fractionally larger than the further icon, and maps to a corresponding sub-region of the image plane of the further video camera, and wherein the further video images captured in the image plane of the further video camera comprise further video frames;
   for each respective further video frame of at least a subset of the further video frames, computationally comparing a further template icon with the further video image of the further icon captured in the corresponding sub-region of the image plane of the further video camera during the respective further video frame;
   for each computational comparison for which the captured image of the further icon during the respective further video frame matches the further template icon to within a further matching threshold: (i) recording information associated with the respective further video frame, and (ii) continuing operation in the first mode; and
   upon occurrence of at least one computational comparison for which the captured image of the further icon during a given one of the respective further video frames fails to match the further template icon to within the further matching threshold: (i) recording information associated with the given one of the respective further video frames, and (ii) switching to operation in a second mode;
   and wherein operating in the second mode further comprises:
   determining a new further template icon that matches the captured image of the further icon during the given one of the respective further video frames to within the further matching threshold;
   setting the further template icon to the new further template icon; and
   switching to operation in the first mode.

20. A non-transitory computer-readable storage medium, having stored thereon program instructions that, upon execution by one or more processors of a system comprising a video camera, cause the system to carry out operations including:
   operating in a first mode, wherein operating in the first mode comprises:
   with the video camera, continually capturing video images in an image plane of the video camera of an icon displayed in a sub-region of a display region of a display device, wherein the display device is external to the system, wherein the sub-region of the display region is fractionally larger than the icon and maps to a corresponding sub-region of the image plane, and wherein the video images captured in the image plane comprise video frames;
   for each respective video frame of at least a subset of the video frames, computationally comparing a template icon with the video image of the icon captured in the corresponding sub-region of the image plane during the respective video frame;
   for each computational comparison for which the captured image of the icon during the respective video frame matches the template icon to within a matching threshold: (i) recording information associated with the respective video frame, and (ii) continuing operation in the first mode; and
   upon occurrence of at least one computational comparison for which the captured image of the icon during a given one of the respective video frames fails to match the template icon to within the matching threshold: (i) recording information associated with the given one of the respective video frames, and (ii) switching to operation in a second mode;
   and
   operating in the second mode upon switching to operation in the second mode, wherein operating in the second mode comprises:
   determining a new template icon that matches the captured image of the icon during the given one of the respective video frames to within the matching threshold;
   setting the template icon to the new template icon; and
   switching to operation in the first mode.

* * * * *